United States Patent [19]

Oba et al.

[11] Patent Number: 4,866,650

[45] Date of Patent: Sep. 12, 1989

[54] ELECTRONIC CALCULATOR HAVING MATRIX CALCULATIONS

[75] Inventors: Toshiro Oba, Nara; Michiaki Kuno, Yamatokoriyama; Noboru Akizuki, Nara; Yoshimitsu Inamori, Yamatokoriyama, all of Japan

[73] Assignee: Sharp Kabushiki Kaisha, Osaka, Japan

[21] Appl. No.: 110,795

[22] Filed: Oct. 21, 1987

[30] Foreign Application Priority Data

Oct. 21, 1986 [JP] Japan .................................. 61-250074
Oct. 21, 1986 [JP] Japan .................................. 61-250075
Oct. 21, 1986 [JP] Japan .................................. 61-250076

[51] Int. Cl.⁴ .......................................... G06F 15/31
[52] U.S. Cl. .................................................. 364/736
[58] Field of Search ............... 364/706, 736, 710, 715, 364/709, 715.01, 709.01, 709.02, 710.01, 710.02, 710.11

[56] References Cited

U.S. PATENT DOCUMENTS 3,794,984 2/1974 Deerfield et al. .................... 364/200
4,247,902 1/1981 Sado ..................................... 364/710

OTHER PUBLICATIONS

*TI Programmable 58C/59 Master Library,* Texas Instruments, Dallas, Texas, 1979, pp. 9–19.

Primary Examiner—Gary V. Harkcom
Assistant Examiner—Dale M. Shaw
Attorney, Agent, or Firm—Birch, Stewart, Kolasch & Birch

[57] ABSTRACT

An electronic calculator carries out input of data, such as numeric values, stores data therein, and performs operations and processing of the input data according to the operation of necessary function keys. Further, inputted matrix data is stored in relation to one code so that when operating the matrix data, the code is utilized for inputting an operational expression, whereby the procedure for inputting such data for operation can be considerably simplified. If it is desired to preserve input data, the data can be protected by preventing rewriting or redefinition thereof. Also, data processing is enabled which excludes any data abnormally different from other data, thereby enhancing the reliability of the results of the data processing.

9 Claims, 18 Drawing Sheets

FIG. 5

| KEY CONTROL IN OPERATION | SCREEN INDICATIONS | |
|---|---|---|
| • FOUR RULES IN ARITHMETIC<br>(MAT)(A)(+)(MAT)(B)(=) | MATA+MATB=<br>MAT ANS<br>MATRIX | → | ANS(1.1)= 0<br>ANS(2.1)= 0<br>MATRIX |
| • STORING(SUBSTITUTING)IN OTHER ARRAYS<br>(MAT)(A)(+)(MAT)(B)(STO)(MAT)(C)<br>(=) | MATA+MATB=HA<br>TC<br>MATRIX | → | ANS(1.1)= 0<br>ANS(2.1)= 0<br>MATRIX |
| • DETERMINANT<br>(2ndF)(DET)(MAT)(B)(=) | DET MATB =<br>-27<br>MATRIX | | |
| • OPERATION OF MATRIX AND SCALAR<br>(MAT)(A)(X)2 (=) | MATA × 2 =<br>MAT ANS<br>MATRIX | → | ANS(1.1)=0<br>ANS(2.1)=0<br>MATRIX |
| • INVERSE MATRIX<br>(MAT)(B)(2ndF)(x⁻¹)(=) | MAT B⁻¹=<br>MAT ANS<br>MATRIX | → | ANS(1.1)=0<br>ANS(2.1)=0<br>MATRIX |
| • TRANSPOSED MATRIX<br>(2ndF)(TRAUS)(MAT)(A)(=) | TRAUS MATA=<br>NATANS<br>MATRIX | → | ANS(1.1)=0<br>ANS(2.1)=0<br>MATRIX |
| • SIGN CHANGE<br>(-)(MAT)(A)(=) | -MATA =<br>MAT ANS<br>MATRIX | → | ANS(1.1)=0<br>ANS(2.1)=0<br>MATRIX |

FIG. 6

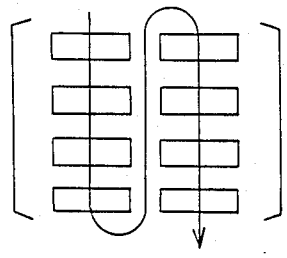

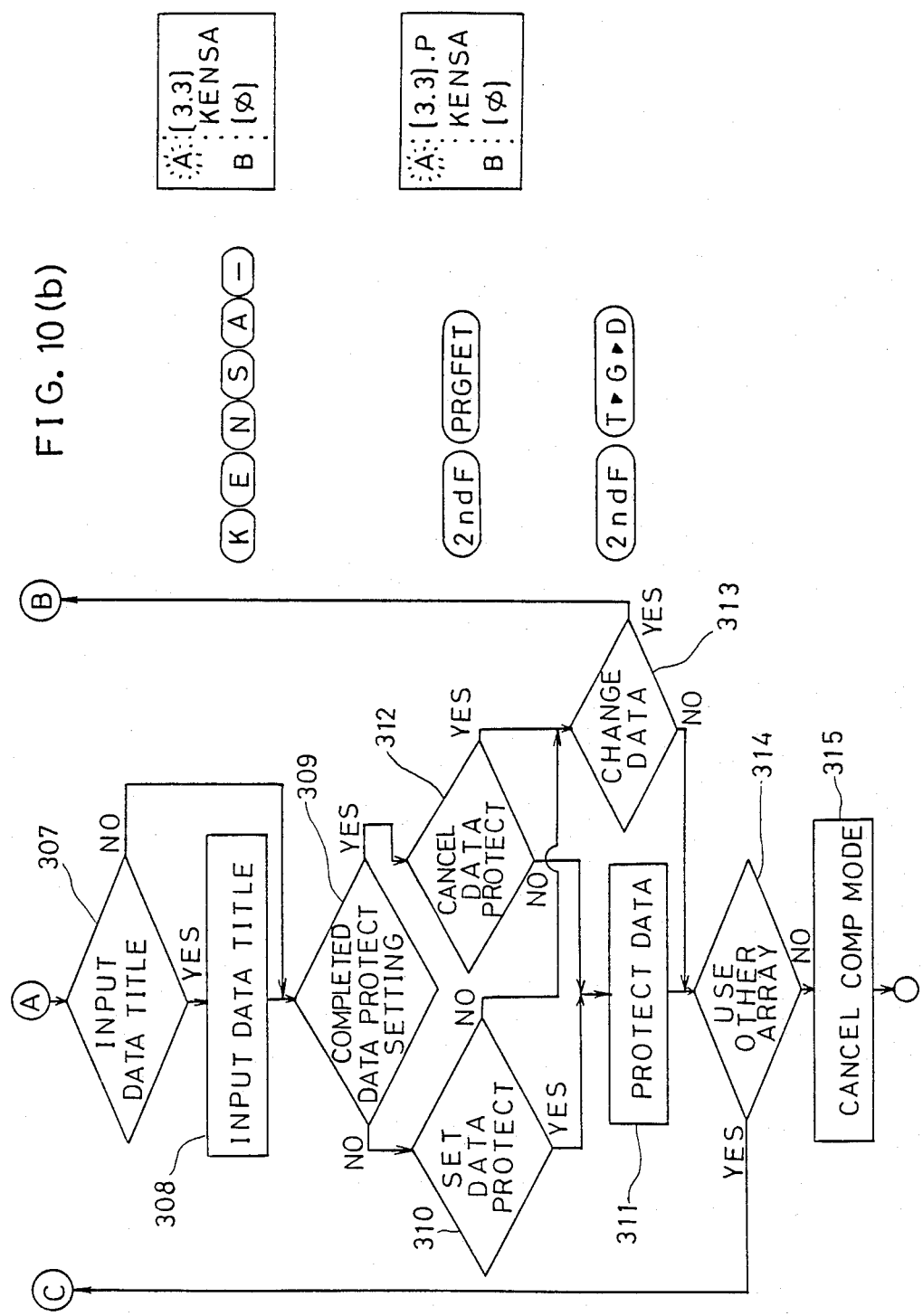

FIG. 11
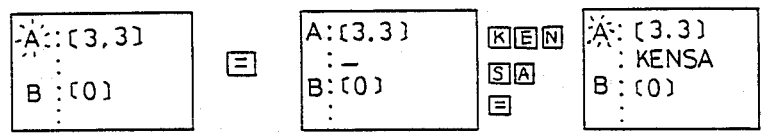
FIG. 12
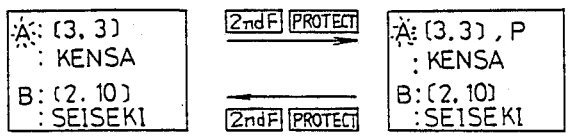
FIG. 13
```
A:(3,3)
 : KENSA
B:(0)
 :  ⌇
R: (10,5)
 :
S: (2,30) ,P
 : SEISEKI
    ⌇
Z:(6) ,P
 :
ANS:
```

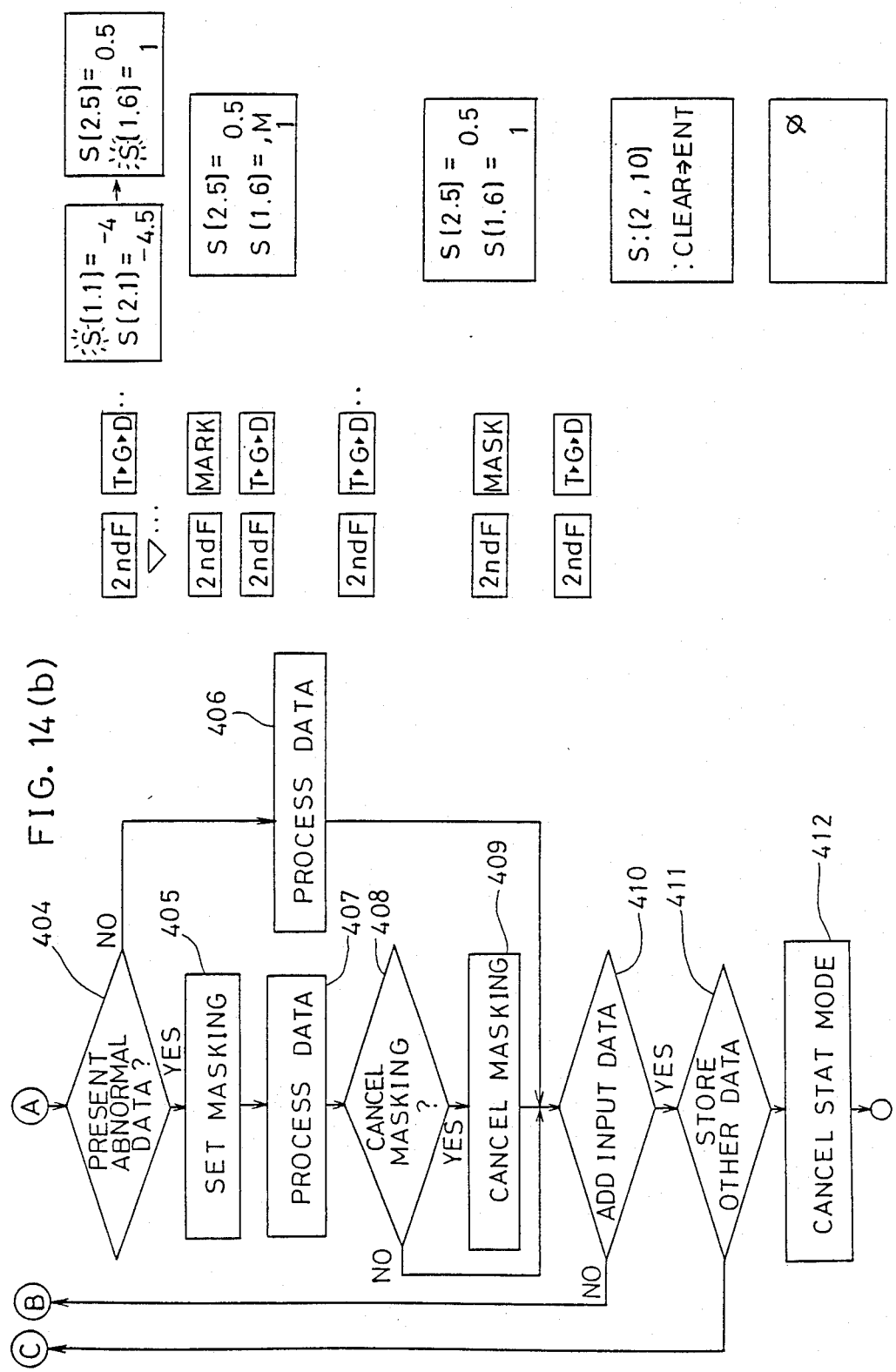

FIG. 15 (a)
INPUT DATA               MASK
| DATA No. | 1 | 2 | 3 | 4 | 5 | 6 | 7 | 8 | 9 |
|---|---|---|---|---|---|---|---|---|---|
| x | -4 | -2 | -1 | 0 | 0.5 | 1 | 2 | 3 | 4 |
| y | -4.5 | -2.3 | -0.9 | 0 | 0.5 | 1.5 | 3.5 | 2.9 | 4.1 |
(a)
FIG. 15 (b)
POST- MASKING INPUT DATA
| DATA No. | 1 | 2 | 3 | 4 | 5 | 8 | 9 |
|---|---|---|---|---|---|---|---|
| x | -4 | -2 | -1 | 0 | 0.5 | 3 | 4 |
| y | -4.5 | -2.3 | -0.9 | 0 | 0.5 | 2.9 | 4.1 |
(b)
FIG. 16
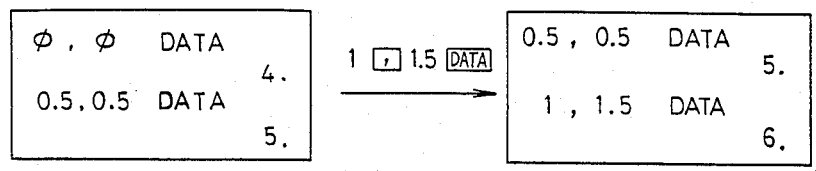
FIG. 17
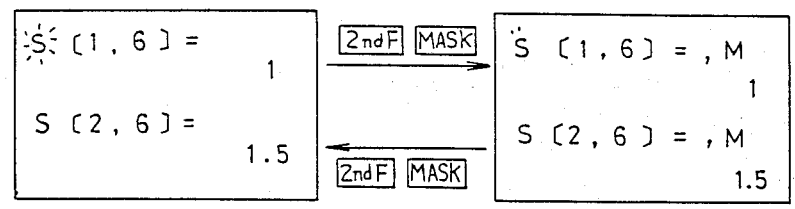

— Normal graph
---- Graph including abnormal values

ELECTRONIC CALCULATOR HAVING MATRIX CALCULATIONS

FIELD OF THE INVENTION AND RELATED ART STATEMENT

The present invention relates to an electronic calculator which carries out input of data, such as numeric values, stores data therein, and performs operations and processing of the input data according to the operation of necessary function keys.

In the art of the electronic calculator there is known an electronic calculator having functional operation functions, which can perform numeric calculation and functional operations. According to such a known electronic calculator, in a case of matrix operations, for example, data of a size of dimension is inputted in order to define a size of dimension and operations of inputted matrices are performed according to the defined size of the dimension. In this case, such data of the size of the dimension and numeric values for each elements must be inputted each time.

According to such a prior-art apparatus, when performing operations on matrices of two rows and two columns each, for example, data for each row and column of each matrix must be inputted each time. This is very troublesome.

For example, where an operation is required on such matrices as shown below, $$\begin{pmatrix} 1 & 2 \\ 3 & 4 \end{pmatrix} + \begin{pmatrix} 5 & 6 \\ 7 & 8 \end{pmatrix} = \begin{pmatrix} 6 & 8 \\ 10 & 12 \end{pmatrix}$$

it is necessary to specify each row and each column of each matrix in order to input each element of each matrix (e.g., numeric value). Further, for an operation result, is is necessary to specify each column and each row so that the operation result is stored. As such, inputting of matrices and an operation equation involve considerable time and trouble.

If a dimension data inputted and stored is of the type which should not be altered, there may be chances of the data being altered in some form or other. If a user performs operations without knowing that the data has been altered, wrong results are obtained. Therefore, it is desired that such input data should be protected as required.

Further, with an electronic calculator having functions to carry out inputting of statistical data, to perform operations on the statistical data, and to cause a necessary graph to be displayed, if a linear functional graph is to be produced, data for x, y are inputted and a graph is displayed on a display unit in accordance with the input data. According to such an electronic calculator, however, a linear functional graph based on the entire input data is displayed on the display unit. Therefore, even if abnormal data is inputted, a graph is presented on the basis of such data, and thus no reasonable graph can be obtained. Where a mean value of input data is required, since abnormal data, if any, is widely different in value from other data, the mean value obtained may be considerably influenced by the abnormal data, and as a result, the mean value and other computations lack reliability.

The present invention is intended to overcome the foregoing difficulties, and accordingly it is an object of the invention to provide an electronic calculator in which an inputted matrix data is stored in relation to one code so that when operating the matrix data, the code is utilized for inputting an operational expression, whereby the procedure for inputting such data for operation can be considerably simplified.

It is another object of the invention to provide the electronic calculator wherein if it is desired to preserve data which has been inputted, the data can be protected in such a way that rewriting of the data, or if the data is a dimension data, for example, redefinition of the data or changing it otherwise, is inhibited.

It is a further object of the invention to provide the electronic calculator which enables data processing with exclusion of any data abnormally different from other data, thus enhancing the reliability of the results of the data processing.

SUMMARY OF THE INVENTION

The electronic calculator in accordance with the invention comprises input means for inputting various data and commands, display means for displaying various data and information, memory means having a plurality of storage areas identified with location codes beforehand, specifying means for specifying desired codes when a series of dimension size data and date of each element for a matrix are to be stored in a desired coded storage area, storage means for storing the dimension size data and the data of each element for the matrix inputted from the input means into the storage area having the desired code specified by the specifying means, matrix operation means for carrying out operation of the matrix stored in the storage areas identified with specified location codes by inputting from the input means a desired operational expression in which the codes specified by the specifying means are used as operational elements, operation result memory means for storing operation results outputted from the matrix operation means, setting means for setting out a dimension size for the operation results in the operation result memory means prior to the operation results being stored therein, and display control means for controlling the display means to display the operation results stored in the operation result memory means.

In the electronic calculator according to the invention, each size of matrix dimension inputted and each element of matrix inputted are treated as a code, therefore this considerably simplifies inputting and processing of data for a matrix operation. More specifically, insofar as inputting for a matrix operation is concernted, the same manner of inputting as in a scalar operation maa be conveniently employed, and thus matrix operations can be readily performed by a very simple operation procedure.

Further, a size of a dimension of a matrix operation result is automatically set, and accordingly each element of the matrix of the operation result is automatically stored. Thus, the operation result can be readily seen.

The above described electronic calculator may further comprise protection means for protecting data stored in storage areas specified by specifying means, whereby data rewriting can be rendered impossible.

The electronic calculator may further comprise mask means for masking, on a command from the input means, any specific data of data stored in particular storage areas of the memory means and operation means for performing operation on the basis of data other than the data masked by the mask means, whereby the reliability of the operation results can be improved.

BRIEF DESCRIPTION OF THE DRAWINGS

FIG. 5 is a representation showing varieties of matrix operations performable by the embodiment;

FIG. 6 is a diagram showing by way of example the manner of scrolling for display of various elements in a matrix;

FIGS. 10(a) and 10(b) are flowcharts showing procedural steps of input data protection according to the embodiment;

FIG. 11 is a schematic view showing by way of example an entry on a display screen to illustrate the manner of naming for input data;

FIG. 12 is a schematic view showing one example of entry on the display screen to illustrate the manner of display for a protected state of input data;

FIG. 13 is an illustration showing protectable data storage areas;

FIGS. 14(a) and 14(b) are flowcharts showing procedural steps of input data masking according to the embodiment;

FIG. 15(a) is a view showing input data by way of example;

FIG. 15(b) is a view showing by way of example the input data in FIG. 15(a) after some of the data have been masked;

FIG. 16 is a view showing an entry on the display screen in the embodiment when data are inputted;

FIG. 17 is a view showing an entry on the display screen when input data are masked;

DETAILED DESCRIPTION OF PREFERRED EMBODIMENTS

Figure 1:
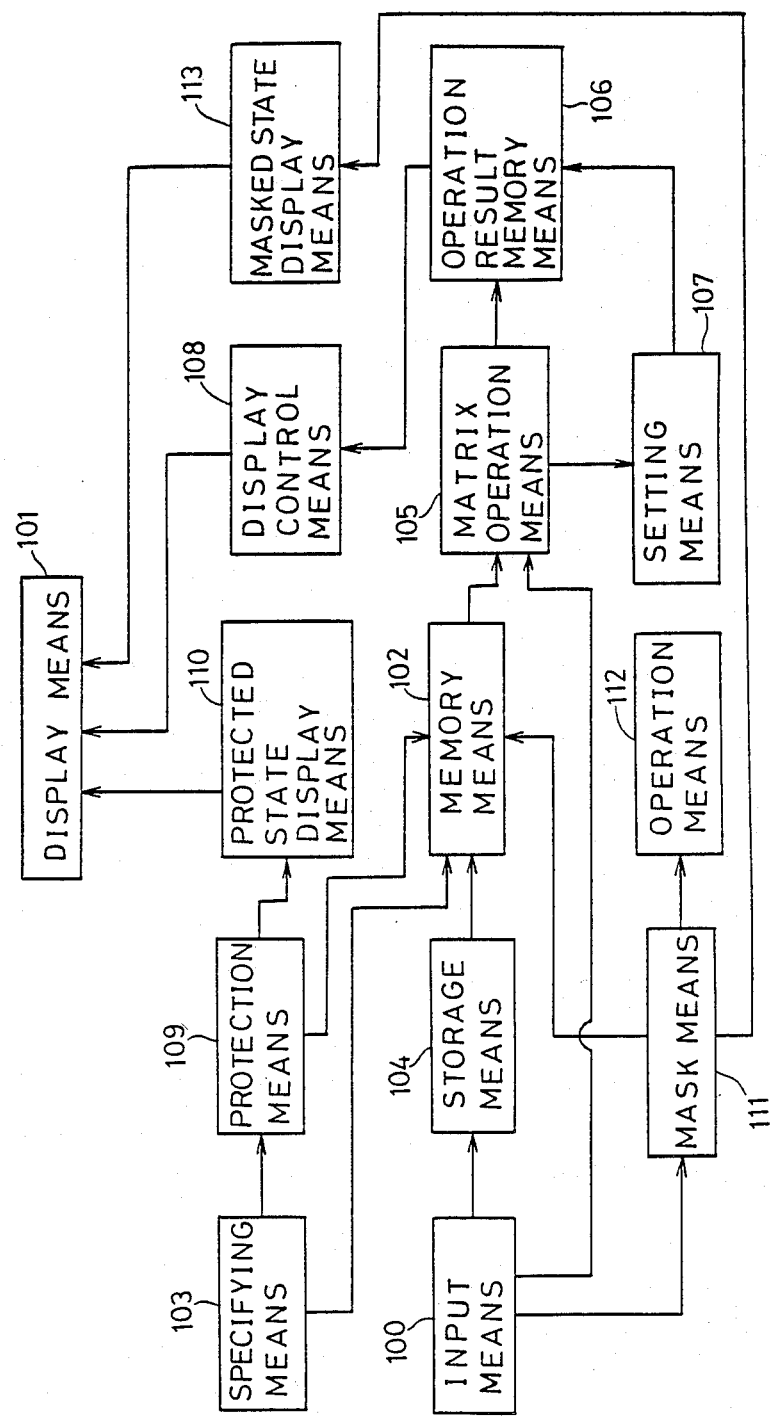
FIG. 1 is a block diagram showing a general arrangement of the invention.

FIG. 1 is a block diagram showing a general arrangement of the invention, in which;

Box 100 designates input means for inputting various data and commands, box 101 designates displaying means for display various data and information, box 102 designates memory means having a plurality of storage areas to store location codes prior to calculations being performed, box 103 designates specifying means for specifying desired codes when a series of dimension size data and data of each element for a matrix are to be stored in desired coded storage areas, box 104 designates storage means for storing the dimension size data and the data of each element for matrix inputted from the input means 100 into the storage areas having the desired code specified by the specifying means box 105 designates matrix operation means for carrying out the operation of the matrix stored in the storage areas containing specified codes input from the input means 100 with a desired operational expression in which the codes specified by the specifying means 103 are used as operational elements, box 106 designates operation result memory means for storing operation results outputted from the matrix operation means 105, box 107 designates setting means for setting out a dimension size for the operation results in the operation result memory means 106 prior to the operation results being stored therein, box 108 designates display control means for controlling the display means 101 to display the operation results stored in the operation result memory means 106, box 109 designates protection means for protecting the data stored in the storage areas specified by the specifying means 103, box 110 designates protected state display means for controlling the display means 101 to display whether or not the data stored in the storage areas specified by the specifying means 103 are protected by the protection means 109, in conjunction with the data, box 111 designates mask means for masking, on a command from the input means 100, any specific data of those stored in particular storage areas of the memory means 102, box 112 designates operation means for performing an operation on the basis of data other than the data masked by the mask means 111, and box 113 designates masked state display means for controlling the display means 101 to display whether or not any data displayed on the display means 101 on a command from the input means 100 out of those data stored in particular storage areas of the memory means 102 are a masked data, in conjunction with the data.

Figure 2:
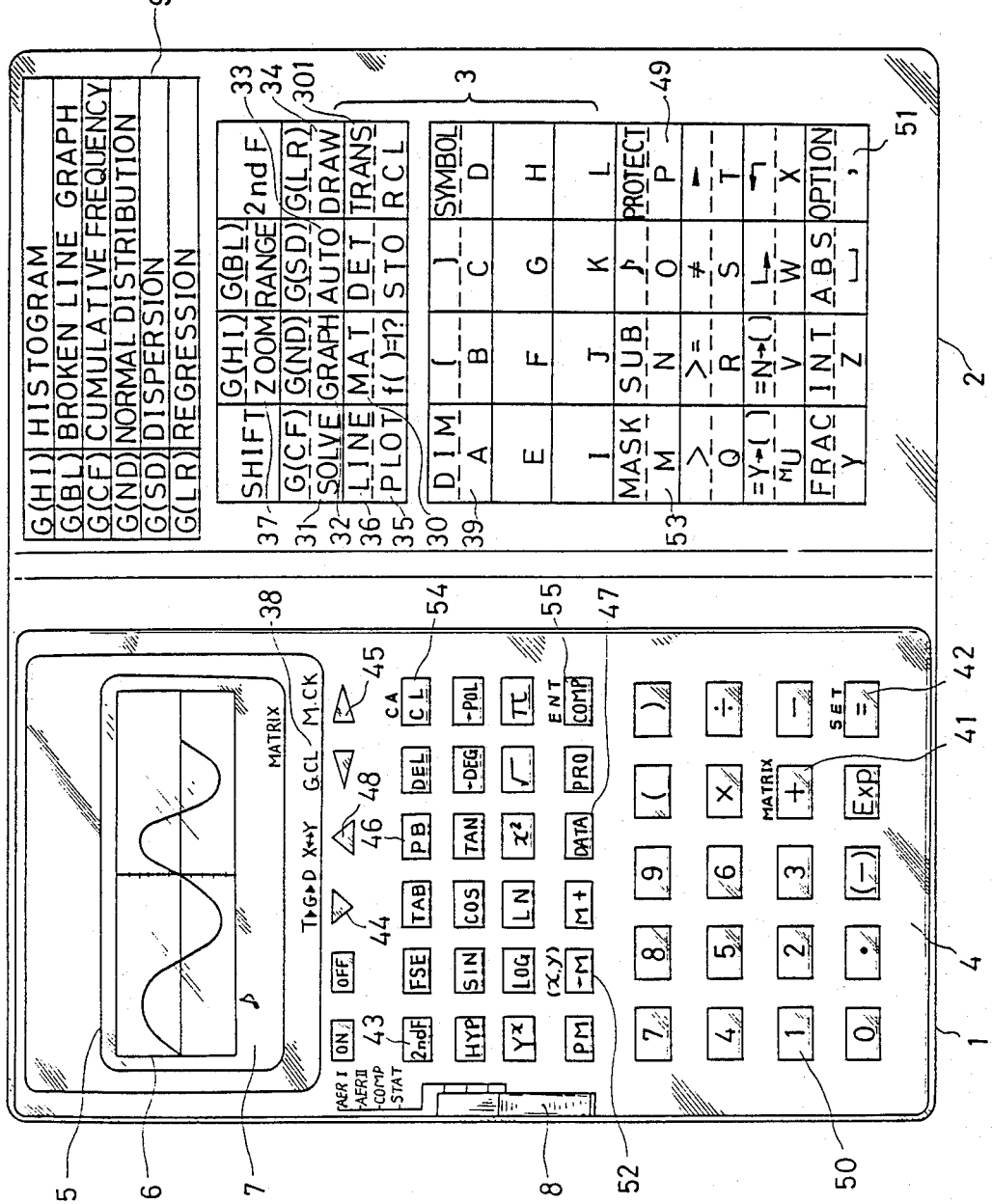
FIG. 2 is a plane view showing one embodiment of the invention.

FIG. 2 is a plane view of an electronic calculator having graph display and functional operation functions which represents one embodiment of the invention. In FIG. 2, element 1 is a calculator body disposed in a left-hand half portion of a flexible cover 2 which can be doubled at the center thereof, and element 3 is a key input device disposed in a right-hand half portion of the cover 2. The key input device 3 is electrically connected to the calculator body 1 and able to key to input to the calculator body 1 in the same manner as a key input device 4 disposed on the calculator body 1. The varieties, number, and arrangement of keys for the key input devices 3, 4 may be the same as those usually known in the art.

Reference numeral 5 designates a display unit which includes a graph display portion 6 comprises of a "96×32" dot (liquid crystal cell) LCD (liquid crystal display) capable of displaying characters in 16 digits and 4 rows as well as graphic representations. The display unit 5 also includes a status display portion 7 which, when a particular key is manipulated, displays a graphic symbol and the like relating to the key to indicate a particular status.

Reference numeral 8 designates a mode changeover switch, which is slide controllable for switching over to COM mode (mainly for performing various kinds of operations), STAT mode (relating to statistics), and AER-I and AER-II modes (algebraical expression memory modes) as required. Shown by 9 is a label indicating types of graphs to be displayed on the graph display portion 6.

Next, principal keys of the key input device 3 will be explained.

A $\boxed{\text{SOLVE}}$ key 31 is an equation solver key for seeking intersections (finding roots) of a plurality of graphs displayed on the screen of the display unit 5.

A $\boxed{\text{GRAPH}}$ key 32 is a graphic instruction key to be manipulated prior to a graphic equation being inputted for display. An instruction for this purpose is executed by manipulating a $\boxed{\text{DRAW}}$ key 34 as an execution key.

An $\boxed{\text{AUTO}}$ key 33 is an automatic graph instruction key for automatically setting a y-axial range for graphic representation of an input equation.

A $\boxed{\text{DRAW}}$ key 34 is a graphic display execution key.

A $\boxed{\text{PLOT}}$ key 35 is an instruction key for displaying coordinates (plots) on the screen of the graphic display portion 6.

A $\boxed{\text{LINE}}$ key 36 is an instruction key for connecting two points by a straight line on the screen of the graphic display portion 6.

A $\boxed{\text{ZOOM}}$ key 37 is an execution key for enlargement and contraction at a specified rate of magnification of graphic representations displayed on the screen of the graphic display portion 6.

A $\boxed{\text{G. CL}}$ key 38 is a key for clearing the screen of the graphic display portion 6, leaving coordinate axes as they are.

Figure 3:
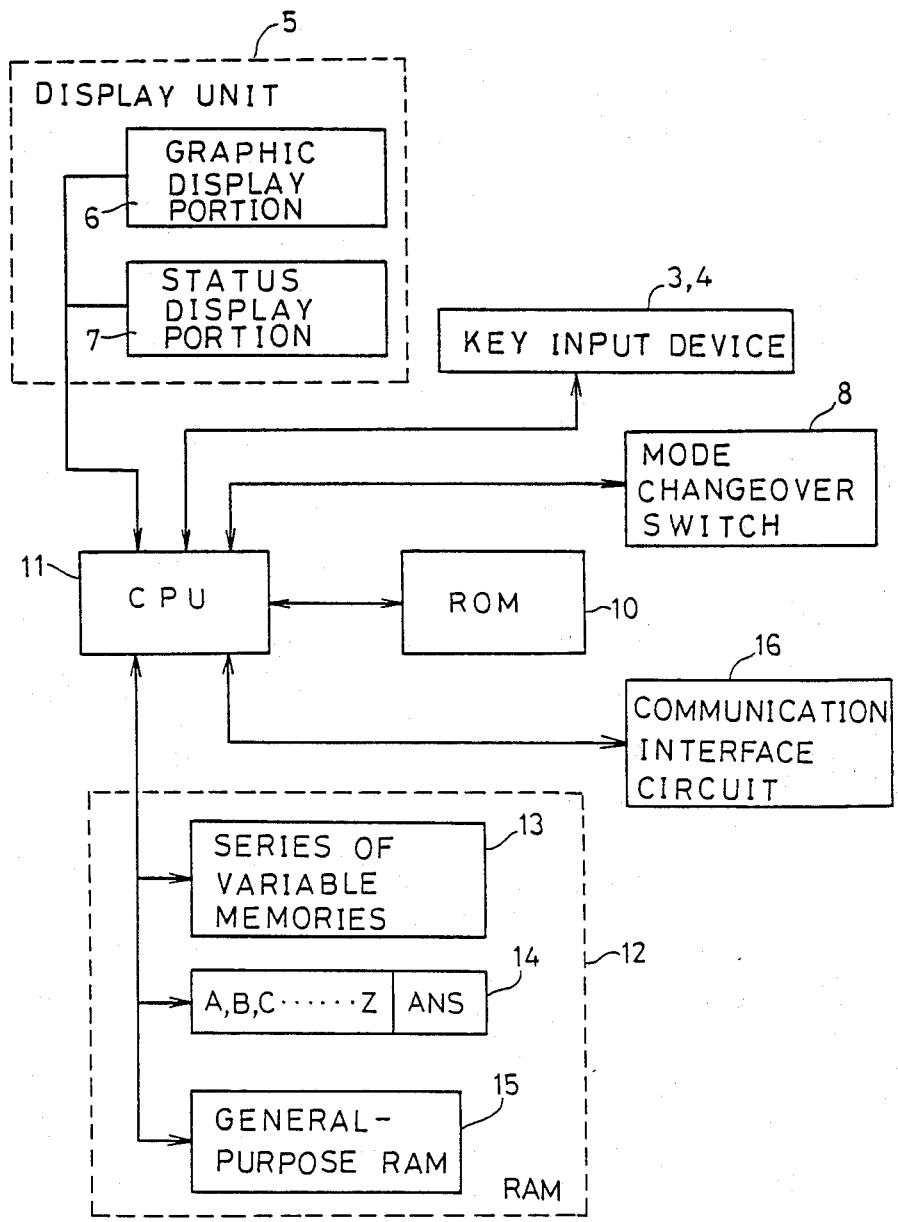
FIG. 3 is a block diagram showing a control circuit arrangement in the embodiment.

Referring now to FIG. 3, which is a block diagram showing the arrangement of the embodiment, 3, 4 are key input devices, 5 is a display unit comprising a graphic display portion 6 and a status display portion 7, and 8 is a mode changeover switch.

Reference numeral 10 designates ROM (read-only memory) for memorizing various programs, 11 designates a CPU (central processing unit) for executing various arithmetic operations and controlling other blocks in accordance with programs of ROM 10, and 12 is a RAM (random access memory) having a capacity of, for example, 8 K byte. This RAM 12 comprises a series of variable memories 13, a series of array memories 14, and a general-purpose RAM provided with actual array contents and a key input buffer. The series of array memories 14 store no actual value. Instead, in the series of array memories there are stored pointers and array sizes for addresses of the general-purpose RAM 15.

The key input devices 3, 4 are provided with 90 input key switches altogether, and through the control of these key switches various different functions can be performed including on/off power control, equation input, and execution of various instructions. Each key is controllable in combination with another key, for example, $\boxed{\text{2nd F}}$ key 43, and has 1–5 kinds of functions depending upon the type of indication given on the sttus display portion 7 and the set position of the mode changeover switch 8.

Shown by 16 is a communication interface circuit.

Figure 4A:
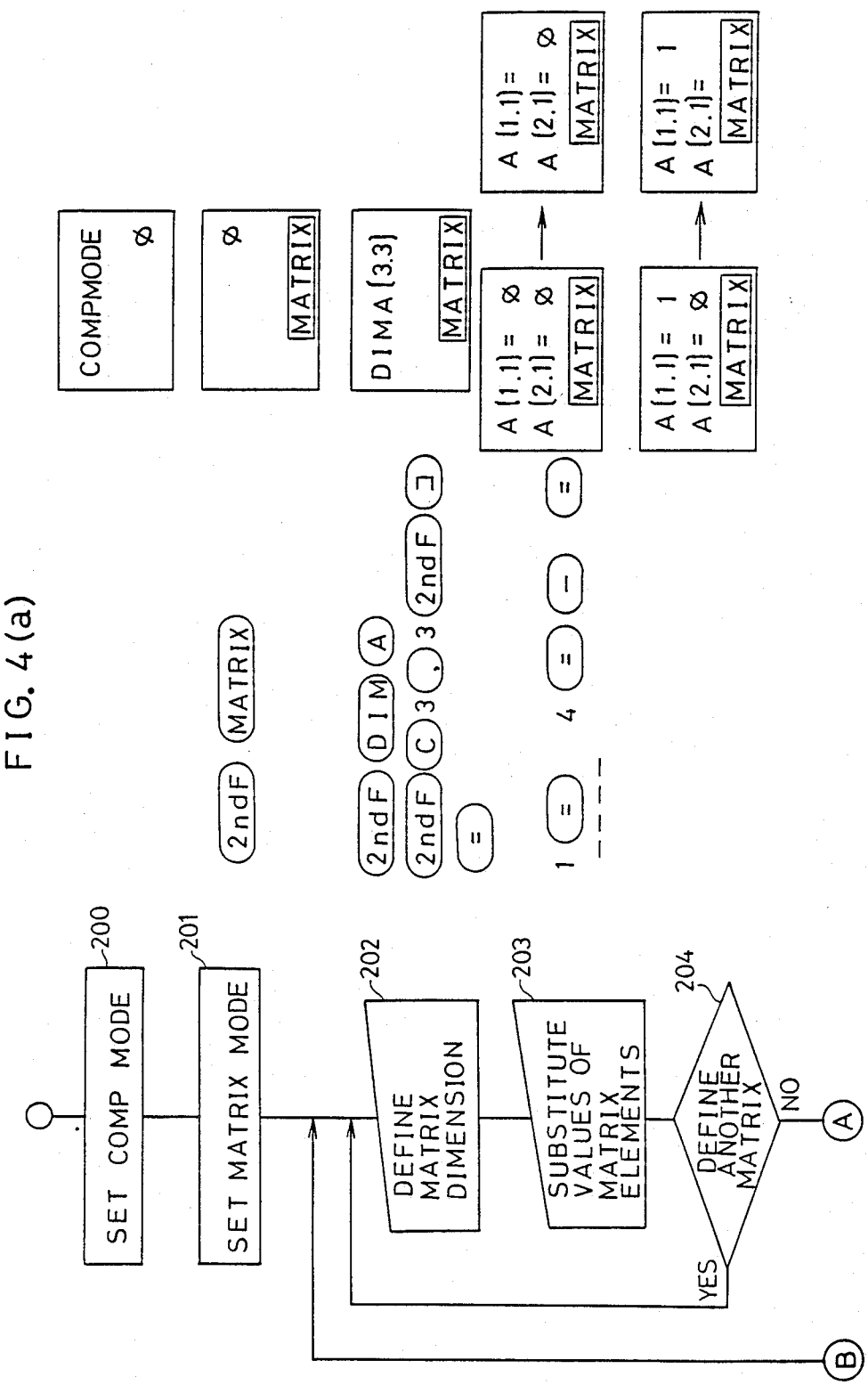
FIGS. 4(a) and 4(b) are flowcharts showing procedural steps of matrix operation according to the embodiment.
Figure 4B:
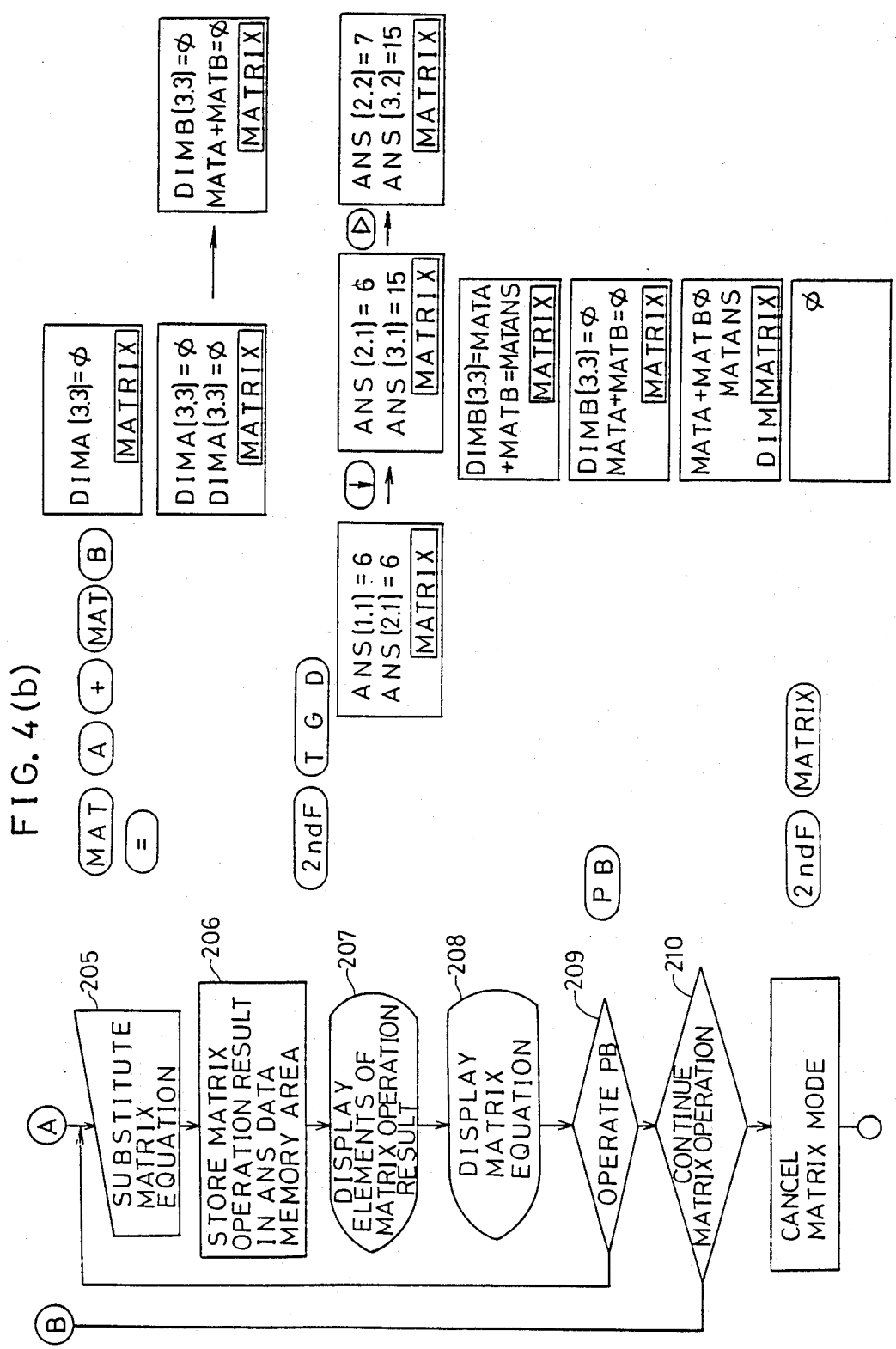

Next, the manner of matrix operation with the present embodiment of the invention will be explained in detail with reference to FIGS. 4(a) and 4(b), which are flowcharts showing steps involved in a matrix operation. In FIGS. 4(a) and 4(b), one example of key inputting according to the flowchart and relevant indications displayed on the graphic display portion 6 are shown in conjunction with the flowchart in order to facilitate understanding of the operation sequence involved.

The mode changeover switch 8 is first set to "COMP mode" position (Step 200). To carry out a matrix operation, $\boxed{\text{2nd F}}$ key 43 is manipulated and the $\boxed{+}$ key 41 is manipulated, whereupon indication "MATRIX" for a MATRIX status (a matrix operation mode) is displayed on the status display portion 7, so that the matrix operation mode is established (Step 201). The $\boxed{\text{2nd F}}$ key 43 is used, for example, to make it possible to input an upper or lower subscripted information item on any of other individual keys, apart from a main function of such other key.

Next, an input control for defining a size of a dimension of a matrix to be used for operation is carried out. For this purpose, the $\boxed{\text{2nd F}}$ key 43 is manipulated, then the $\boxed{\text{A}}$ key 39 is manipulated, whereby a key inputted is effected for the upper subscripted information item on the $\boxed{\text{A}}$ key 39 as above noted, which carries the effect of the $\boxed{\text{DIM}}$ key control. The $\boxed{\text{A}}$ key 39 is then manipulated to specify a data storage area with code "A" for entry of a data of a size of dimension. In this instance, data of a size having a dimension of 3 rows and 3 columns is inputted and stored in the data storage area with code "A" (Step 202). For example, pointers for individual elements of a matrix and the data of the size having a dimension of 3 rows and 3 columns which are to be stored in the general-purpose RAM 15 of RAM 12 are entered for storage in the series of array memories 14.

After the dimension data is entered in manner as above described, data of elements of individual rows and columns (values for a matrix operation) are inputted (Step 203). In this case, the display screen of the graphic display portion 6 specifies locations for individual elements to be inputted. Therefore, inputting of the elements is effected by manipulating the $\boxed{=}$ (SET) key 42 after input keying of relevant value keys in accordance with the indications on the display screen, the input values being then displayed on the graphic display portion 6. In the present instance, as shown, "1" is substituted for 1st row, 1st column, and "4" is substituted for 2nd row, 1st column. In this case, on the graphic display portion 6 there are previously given indications "1, 1", "2, 1" and so on for rows and columns, and therefore values and the like for individual elements can be readily entered into the relevant matrix according to the indications on the screen of the display.

In this way, inputting of values for individual elements are sequentially effected according to the size of specified dimensions, and the data so inputted are stored in the general-purpose RAM 15 and pointers which indicate storage areas for the data are stored in the series of array memories 14. It is noted in this conjunction that for matrix input purposes, the series of array memories 14, as a whole, may include 26 data storage areas matched with codes of "A"–"Z" beforehand. Further, for the purpose of storing operation results, the series of array memories 14 have a data storage area code "ANS" in addition to the "A"–"Z" data storage areas. In the same manner as other data storage areas, the "ANS" data storage area will store pointers for addresses in the general-purpose RAM 15 in which individual elements are stored and also data of specified size dimension.

When entry of value data for individual elements of the matrix is thus completedd, a decision is made as to whether or not another matrix definition is to be made (Step 204). If another matrix definition is to be made, after returning to Step 202, operation should be carried out beginning from said step in the same way as described above. In this case, other data storage areas than those previously used in the series of array memories 14 should be selected for data input. If the data storge areas previously used are set for new data input, the new data so inputted are stored therein in place of the previously inputted data. Matrix inputting is carried out in this way.

In the present embodiment, as above described, individual matrices are stored in particular data storage areas specified. Now, if an addition operation is to be carried out with matrices stored in data storage areas put having codes "A" and "B" in the series of array memories 14, the operation is performed in the following manner. First, the [MAT] key 30 and the [A] key are manipulated, then the [+] key 41, the [MAT] key 30, and the [B] key are sequentially manipulated, whereby inputting is completed of an addition equation using codes "A" and "B" as operation elements. In this input state, if the [=] key 42 is manipulated, then a matrix operation is performed (Step 205), and the result of the operation is stored in the "ANS" data storage area in the series of array memories 14 (Step 206). In this conjunction, it is noted that prior to the result of the matrix operation being so stored, a size of dimension for the matrix operation result is automatically established and stored in the "ANS" data storage area, and values for individual elements of the operation results are stored in the general-purpose RAM 15 according to the dimensions so established, while pointers for addresses in this RAM 15 are stored in the "ANS" data storage area. The size of dimension of the operation result may, for example, be established as follows:

$$m \text{ row } n \text{ column} \pm m \text{ row } n \text{ column} = m \text{ row } n \text{ column}$$

$$m \text{ row } n \text{ column} \times n \text{ row } l \text{ column} = m \text{ row } l \text{ column}$$

$$m \text{ row } n \text{ row} \div n \text{ row } n \text{ column} = m \text{ row } n \text{ row}$$

This is determined by a four arithmetic operation equation, and thus the dimension size data is stored in the "ANS" data storage area.

In the present embodiment, as above stated, a matrix is treated as one code for the purpose of an arithmetic operation, it being thus possible to perform the operation in same manner as a scalar operation. That is, data storage areas coded "A"–"Z" of the series of array memories 14 are selectively specified for relevant data input, and by virtue of this coding, matrix operations can be performed in the same way as a scalar operation. It is also possible to carry out an arithmetic operation by including matrices in an ordinary numerical operation. For example, when, as in the following equation, four arithmetic operations are carried out with scalars and matrices expressed by codes "A", "B" and "C":

$$5 + \text{MAT A} \times \text{MAT B} \div 3 - \text{MAT C} \ldots = \quad (1)$$

it can be readily seen that an addition, a subtraction, a multiplication, and a division are performed with elements of all the matrices in relation to the scalars. Matrix operations can be carried out not only with such equations as above given, but also with such types of equations as shown in FIG. 5. Also, it is possible to execute an operation with a transposed matrix by using the [TRANS] or the like exclusive key 301.

The matrix operation results are automatically stored in the "ANS" data storage area. If desired, such the result may be stored in specified ones of the "A"–"Z" coded data storage areas of the series of array memories 14. Such storing is shown by way of example in FIG. 5.

The manner of displaying operation results will now be explained. As stated earlier, the operation results are stored in the "ANS" data storage area of the series of array memories 14, and therefore the contents of this "ANS" data storage area are displayed on the graphic display portion 6 (Step 207). For the sequence of display, the indication of 1st row, 1st column ("1, 1") is first given, and next to it a corresponding value of the operation result, for example "6" is displayed. Simultaneously, the result of an operation for 2nd row, 1st column, is also displayed. Operation results for other columns are displayed by scrolling through control of the ∇ key 44 and the ▷ key 45. For example, if the ∇ key 44 is manipulated, the result for 3rd row, 1st column is displayed and if the ▷ key 45 is manipulated, 2nd column is displayed in such manner that if, for example, the result for 1st row, 1st column is already displayed in an upper position, the results for 1st row, 2nd column and for 2nd row, 2nd column are respectively displayed at corresponding upper and lower positions. It is noted that if the ∇ key 44 is repeatedly manipulated, the display is scrolled in such sequence as shown in FIG. 6.

If the matrix operation equation corresponding to the operation results is to be displayed again, the [2nd F] key 43 and the ∇ key 44 should manipulated, which carries the effect of the [T▶G▶D] key being manipulated, so that display changeover is effected. By this key control is displayed the matrix operation equation thus inputted as shown (Step 208). If another matrix operation equation is to be inputted, the [PB] key 46 is manipulated (Step 209), whereupon a procedure returns to Step 205, so that inputting of another matrix operation equation is made possible. In this case, codes "A"–"Z" of data storage areas stored in the series of array memories 14 may be selectivel yspecified for input purposes, whereby inputting of the operation equation can be effected very easily. A decision is made as to whether or not the matrix operation should be continued (Step 210). If the decision is to cancel the matrix operation mode, it is executed by manipulating the [2nd F] key 43, and the [MATRIX] key ([+] key) 41, as in the case of matrix operation mode setting (Step 211). That is, in the state of a non-matrix operation mode, a matrix operation mode is established by the aforesaid key control, whereas in the state of a matrix operation mode, the mode is cancelled by same key control.

Figure 7A:
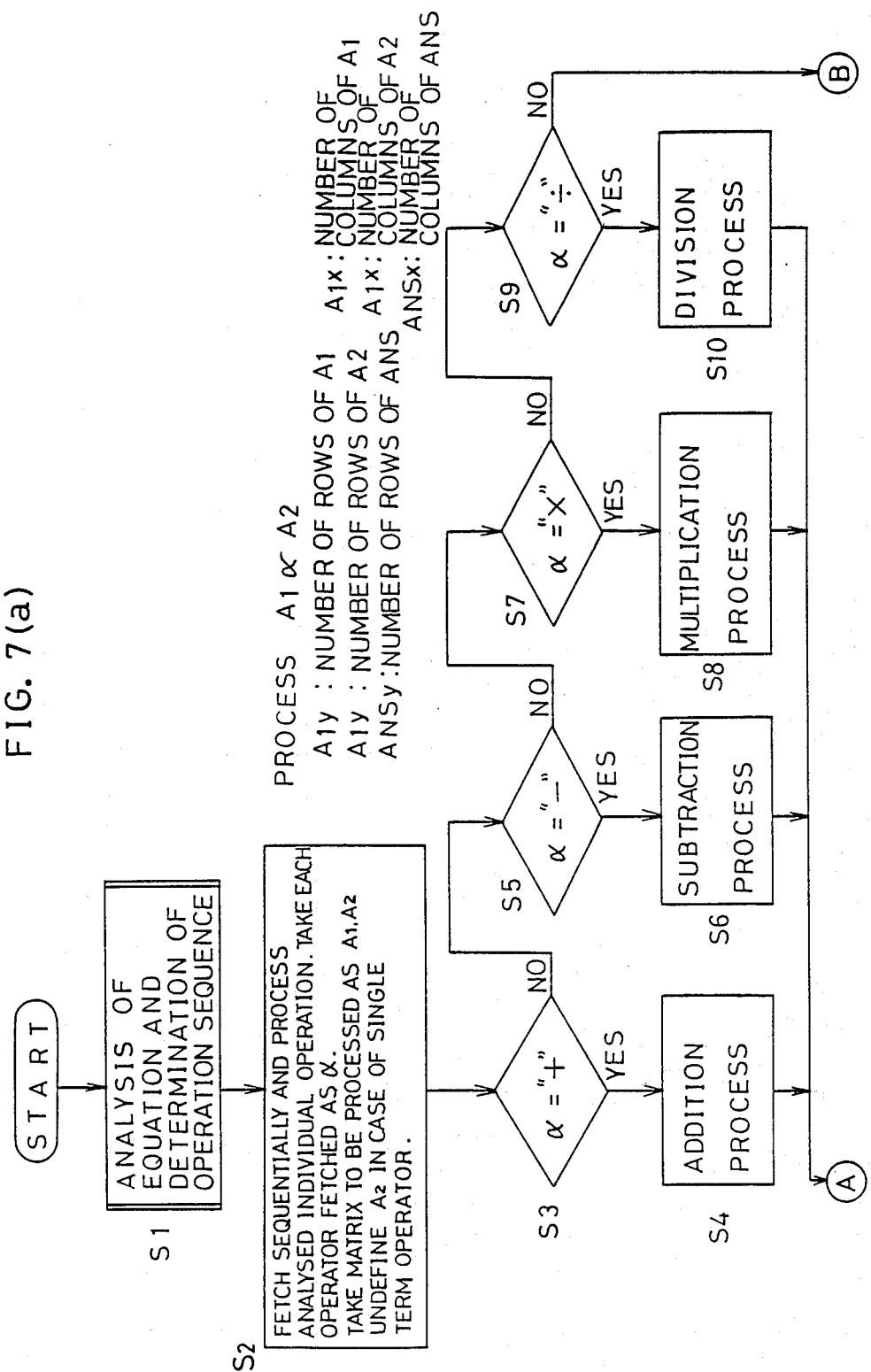
FIGS. 7(a) and 7(b) are flowcharts showing details of matrix operation results as they are stored in data storage areas.
Figure 7B:
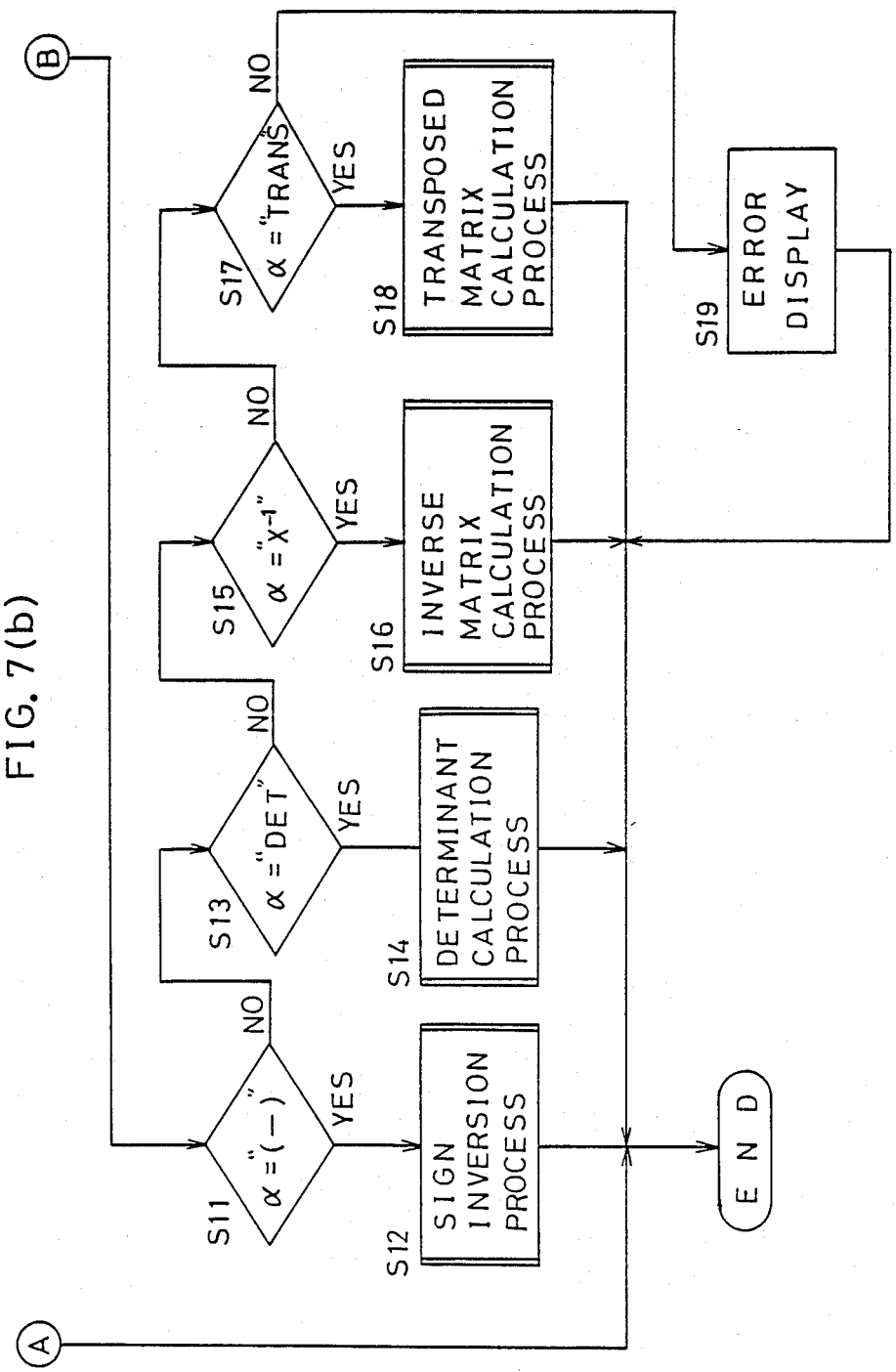

FIG. 5 shows examples of matrix operations. The size dimension of matrices in the matrix operation and the manner of storing date in the "AN" data storage area are illustrated in detail with reference to relevant equations in FIGS. 7(a), 7(b) and 8. In FIGS. 7(a) and 7(b), equations are analyzed and an order of precedence is determined with respect the analyzed equations. Then, judgement is made as to whether the operation consists of four arithmetic operations or otherwise. For input of data into the "ANS" data storage area and matrix size setting in four arithmetic operations, illustrations are given in FIGS. 8(a)–(g). For operation checks I and II in FIGS. 8(a)–(g), details are given in FIGS. 9(a) and (b). The size of a matrix operation result consisting of four arithmetic operations is already explained. The manner of actual operation is not within the scope of the invention and is widely known, and therefore, it is not shown.

At Step S1 in FIG. 7(a), the procedure involved can be performed by a conventional electronic calculator having a functional operation function. At the step of matrix equation computation [S14 in FIG. 7(b)], the solution is scalar, which has no direct relationship with the invention. Multiplication and division with matrix and scalar is not particularly shown in the flowchart. In this case, the size of the operation result is of the same order as that of the original matrix.

Figure 8A:
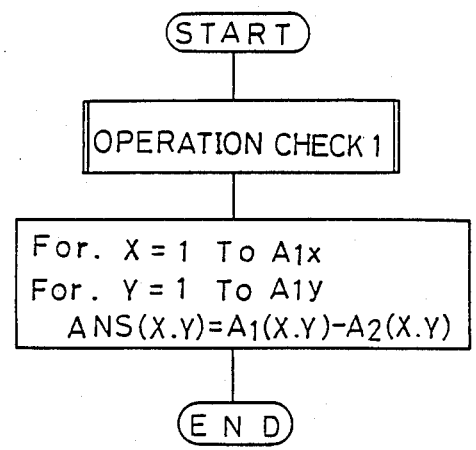
FIGS. 8(a)-8(g) are flowcharts for individual operations.
Figure 8B:
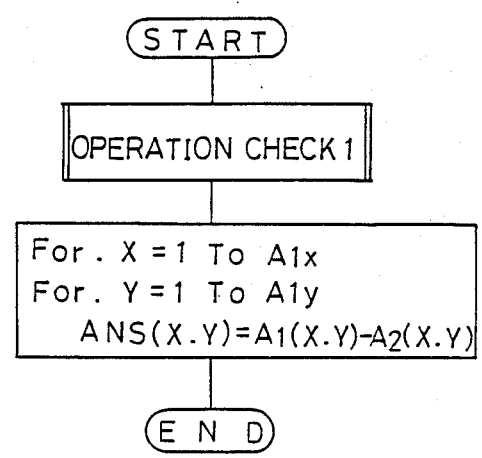
Figure 8C:
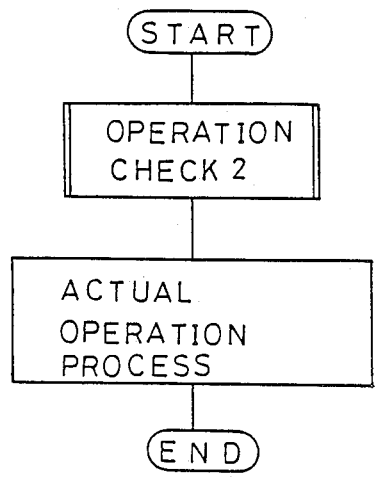
Figure 8D:
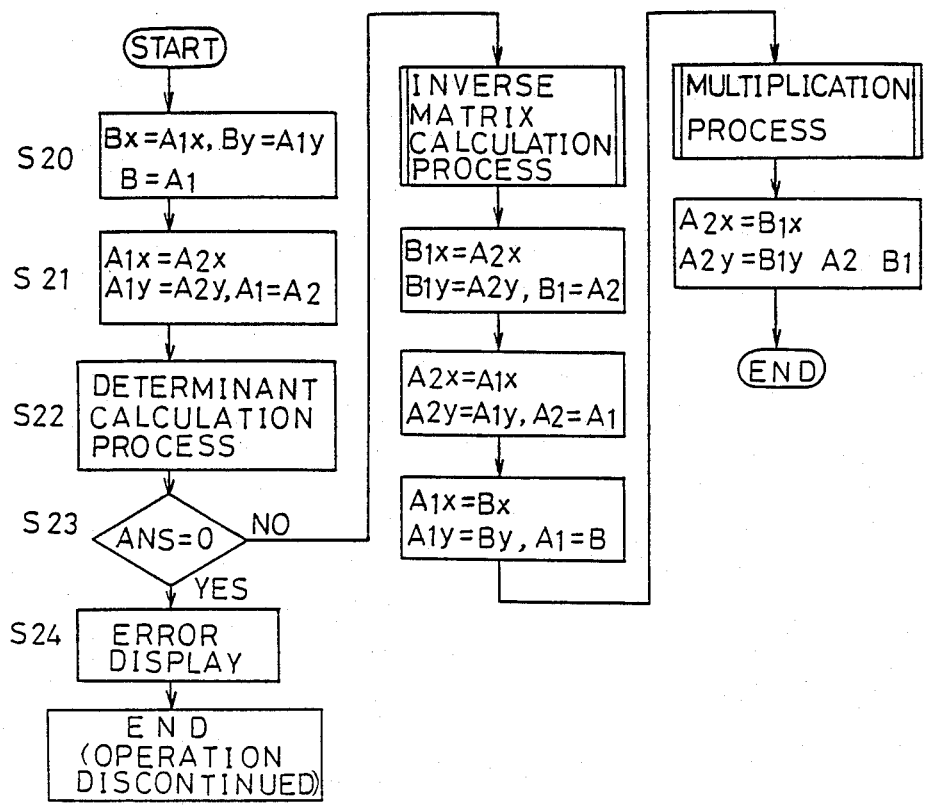
Figure 8E:
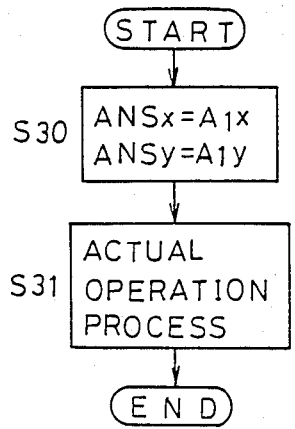
Figure 8F:
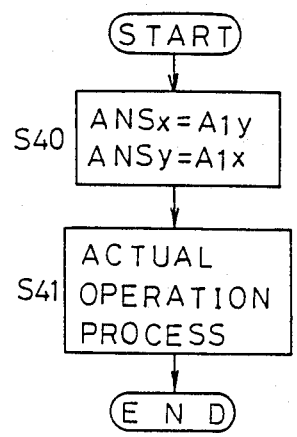
Figure 8G:
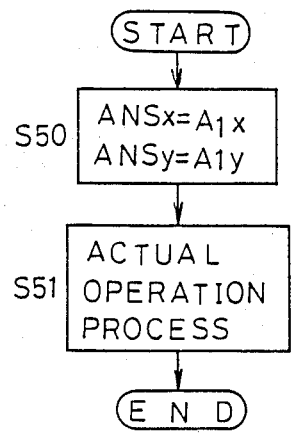
Figure 9:
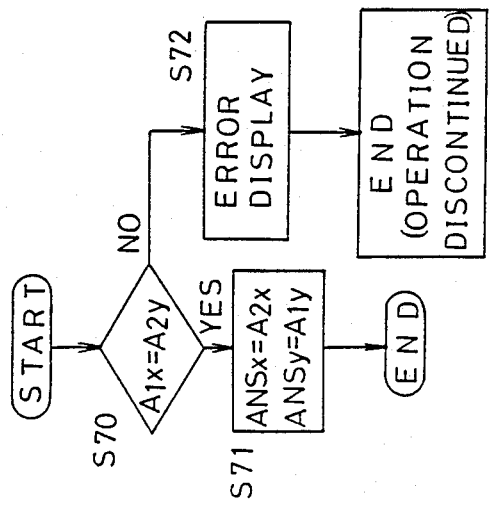
FIGS. 9(a) and 9(b) are flowcharts for operation checking.
Figure 9:
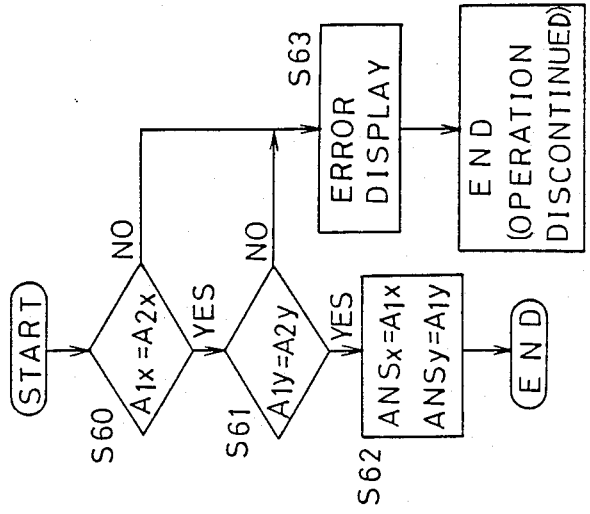

The inverse matrix in FIG. 5 is illustrated in FIG. 8(e). Likewise, the transposed matrix is illustrated in FIG. 8(f), and the sign change in FIG. 8(g).

Figure 10A:
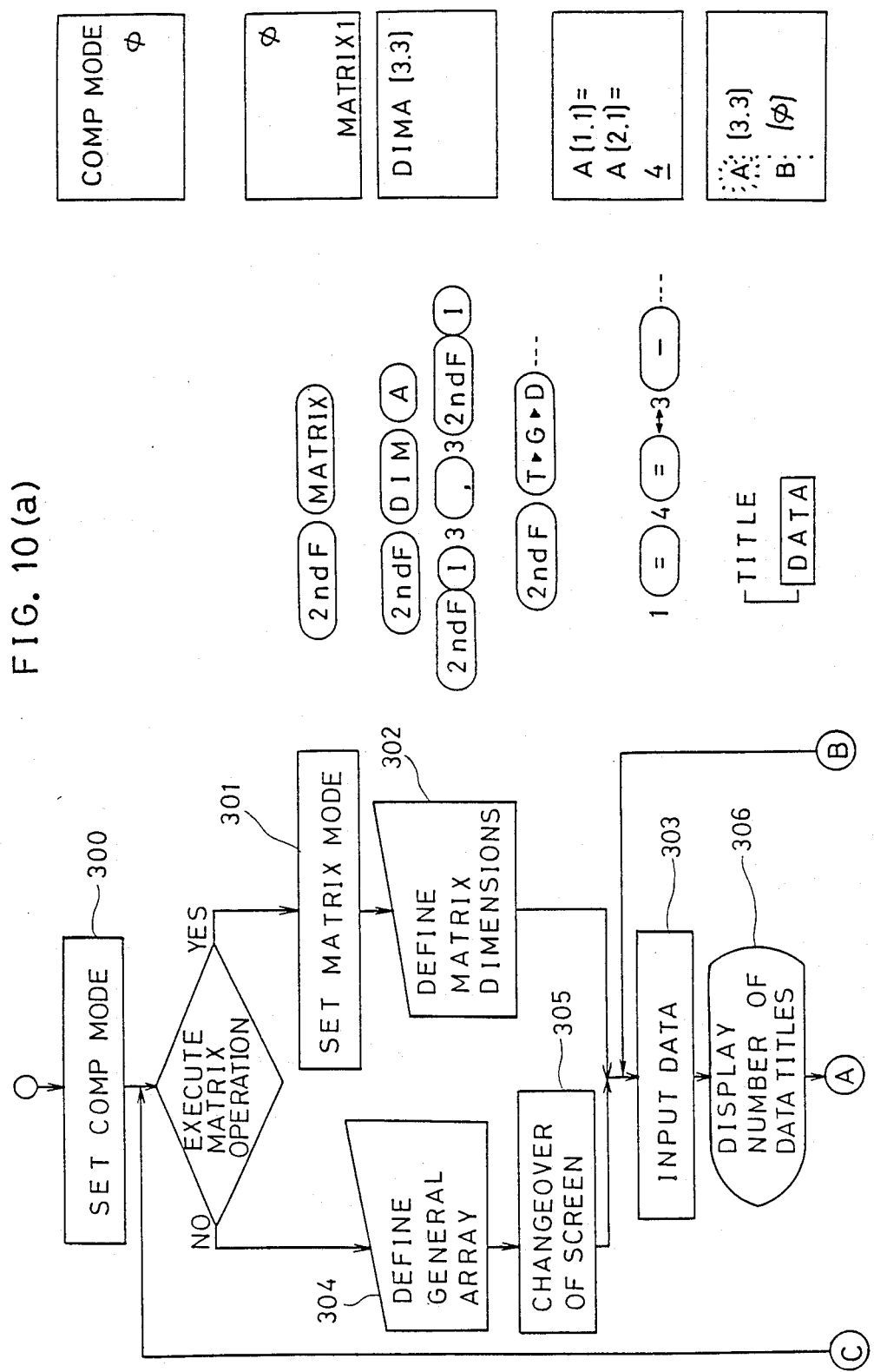

Next, the input data protection function of the present embodiment will be explained in detail with reference to flowcharts given in FIGS. 10(a) and 10(b). In FIGS. 10(a) and 10(b), one example of key inputting according to the flowcharts are illustrated, in conjunction with relevant indications given on the graphic display portion 6, in order to facilitate better understanding of operational features of the embodiment.

The manner of inputting the matrix data to be protected is the same as that explained with respect to Steps 200, 201, 202 and 203 in FIG. 4(a), and therefore, explanation thereof is omitted. In FIG. 10(a), however, Steps 300, 301, 302 and 303 are shown which correspond respectively to Steps 200, 201, 202 and 203 in FIG. 4(a).

In the matrix operation mode in the course of the above mentioned steps, upon completion of the inputting of a dimension definition, the screen automatically changes from a test screen status to a data screen status ready for a data input.

In contrast to this, where general array dimensions are involved, a dimension definition inputting is carried out in same way (Step 304) as in the above mentioned case, but the screen does not change to the data screen status upon completion of the inputting. Therefore, the 2nd F key 43 and the ∇ ( T▶G▶D ) key 44 are manipulated to change the screen status to the data screen status (Step 305).

After a matrix data input is completed in the manner as above mentioned, the DATA key 47 is manipulated to change the screen to a data title screen status (Step 306). The input data is read out so that the content of the data is displayed on the graphic display portion 6. By utilizing this screen it is possible to input a title for the data, if necessary, together with the dimension data inputted (Step 307).

The manner of title input will be explained in this conjunction. As illustrated by way of example in FIG. 11, when the screen is in the data title screen status (i.e., inputted dimension data display status), in order to select an input data area displayed, the ∇ key 44 of the ∆ key 48 is manipulated to move a cursor for specifying a selected area. If the position of the cursor corresponds to character A, the character A flicks. If the = key 42 is manipulated at a position to which the cursor has been moved, a pointer stands showing readiness for the title input. In the case of FIG. 11, the title is "KENSA" and, after the title is inputted, the = key 42 is manipulated, whereupon naming is completed (Step 308). If the title input is unnecessary, the aforesaid key manipulation should not be done.

Next, the manner of data protection control in the present embodiment will be explained. When protecting the data (Step 309), as well as the title therefore, a desired data storage area is specified by means of the ∇ key 44 or the ∆ key 48. If the data storage area is not in protected state, the P key 49 is manipulated after the 2nd F key 43, which carries the effect of the PROTECT key being manipulated. Thus, the specified data is placed under protection. Referring to FIG. 12, which illustrates a protected state of data, in order to specify a data storage area having a code "A" or "B", the cursor is moved on the screen of the same status as in the case of title input by manipulating the ∇ key 44 or the ∆ key 48. As shown, for example, character A representing the data storage area "A" flicks as the cursor moves thereto. In this condition, the 2nd F key 43 is manipulated, then the PROTECT key ( P key) 49 is manipulated, whereupon the data storage area "A" is placed under protection (Step 310). When the data storage area is protected, redefinition of the dimension data stored in the series of array memories 14 and any addition to or change of the data stored in the general-purpose RAM 15 are rendered impossible, the data being thus protected (Step 311). When the data is protected, "P" lights on the right-hand side of numerals denoting the type and number of units of data to indicate that the data is in a protected state, so that whether the data is protected or not can readily be seen.

The protected state can be cancelled by following same procedure as in the case of protection setting. That is, the data storage area in the protected state is specified by a movement of the cursor through the manipulation of the ∇ key 44 or the ∆ key 48, and then the 2nd F key 43 and the PROTECT key 49, is manipulated whereby the data is released from the protected state (Step 312). Simultaneously, the "P" indication on the graphic display portion 6 goes out. The cancellation of such a protected state can readily be effected since there is an indication in the screen that the data is under protection.

As FIG. 13 shows, the protectable range of data storage areas covers 26 areas having codes of "A"–"Z", of which the data storage area S is exclusive for the dimension data in "STAT mode". Therefore, if the dimension data is inputted in "STAT mode" and the mode is switched over to "COMP mode", the data is automatically placed under protection. If any change is to be made with the data, the protected status must first be cancelled prior to such change and it is necessary to change the data after the cancellation. The data storage area Z is exclusive for statistics quantity and cannot be used for other purposes.

When changing the data in "COMP mode", the 2nd F key is manipulated, then the T▶G▶D key (∇ key) 44 is manipulated, whereupon the screen is switched over to the data screen status. After such a condition is reached, the desired change can be effected by following the same procedure as in the case of data input (Step 313). When using other arrays, definition of dimensions be first made (Step 314). A cancellation of the COMP mode is effected by sliding the mode changeover switch 8 (Step 315).

Figure 14A:
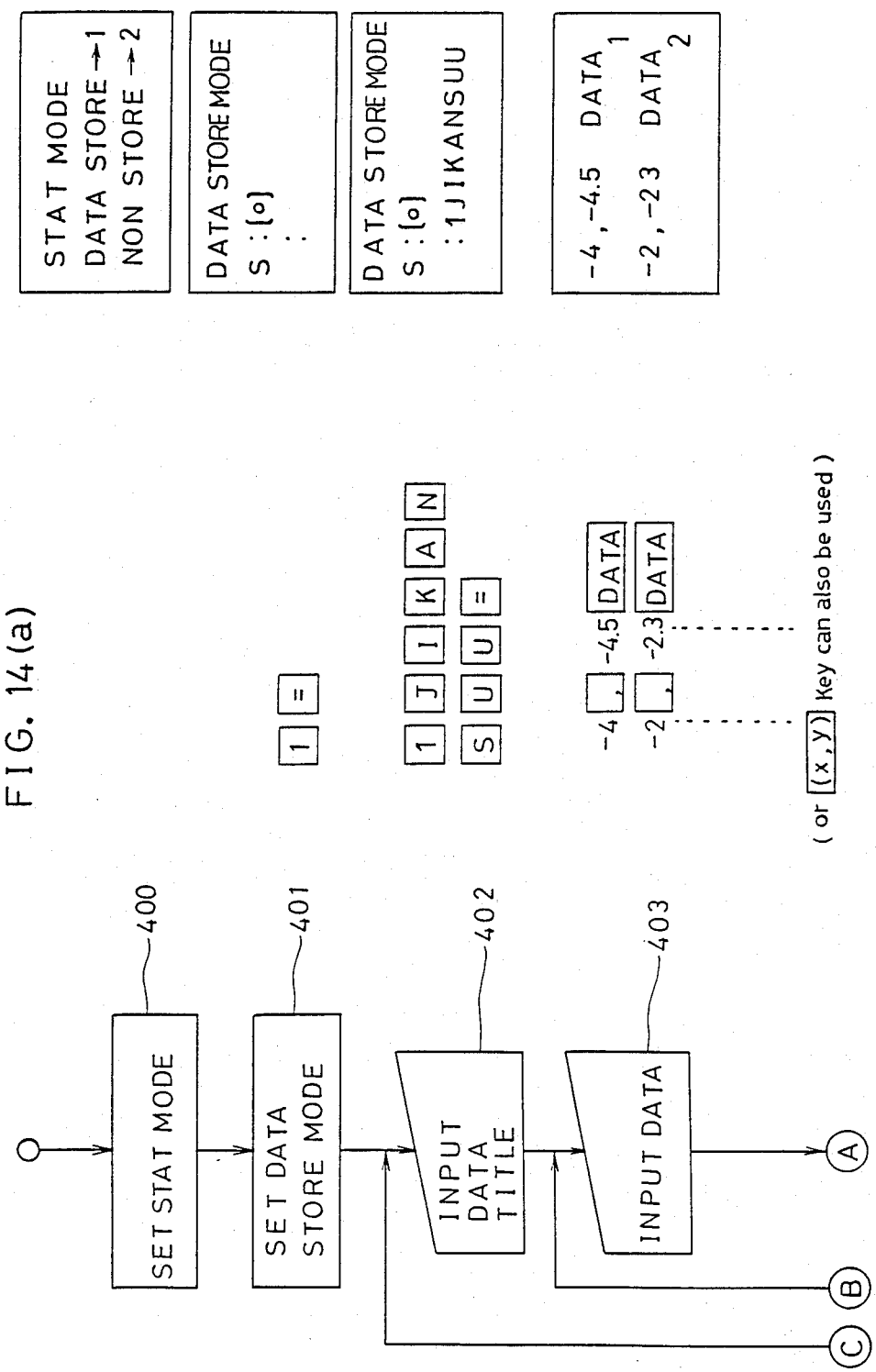

Next, the function of input data masking of the present embodiment will be explained in detail with reference to flowcharts given in FIGS. 14(a) and 14(b). In FIGS. 14(a) and 14(b), one example of key inputting according to the flowcharts are illustrated, in conjunction with relevant indications given on the graphic display portion 6, in order to facilitate better understanding of operational features of the embodiment.

First, "STAT mode" is selected by sliding the mode changeover switch 8 (Step 400). When this mode is selected, an indication as to whether or not a data store mode is to be selected or not is given on the graphic display portion 6 as shown. Then, if the [1] key 50 and the [=] key 42 are manipulated, the data store mode is selected and established (Step 401). Upon the selection of the data store mode, input data are automatically stored in the data store area "S". It is then possible to input a title for the data to be inputted (Step 402). The example shown is a case in which data (values) for a linear function x, y are input, a title "1 JIKANSUU" being inputted for the data. After the title is inputted, if the [=] key 42 is manipulated, the title is stored and concurrently it is displayed on the graphic display portion 6. Such a title may be inputted as required, and if not necessary, it need not be inputted.

After the title is inputted, data for x, y are inputted (Step 402). This data input can be effected by manipulating numeric value keys, then the DATA key 47. In this case, if two variables are to be inputted, after numeric value key inputting (for which purpose certain other keys can also be used), the [,] key 51 is manipulated, or the [x, y] key 52 is manipulated, then numeric value keys are manipulated, and thereafter the [DATA] key 47 is maniuplated, whereby the data input can be effected. If one variable is to be inputted, the data input can be carried out by manipulating numeric value keys, then the [DATA] key 47. One example of the data input for x, y is given in FIG. 15(a).

As can be seen from FIG. 15(a), data inputted is displayed on the graphic display portion 6 simultaneously with the input of the data. Numerals given one row lower than input data indications (numerals 5 and 6 in FIG. 16) represent total numbers of input data, which correspond to input data numbers indicated in FIG. 15(a). The input data are such that the title for the data is stored in a data storage area with code "S" of the series of array memories 14 of RAM 12, while such data as shown in FIG. 15(a) which correspond to the title are stored in general-purpose RAM 15. Pointers for addresses in the data memory areas which are stored in the general-purpose RAM 12 are stored, together with titles, in the data storge area with code "S" of the array memories 14.

When an input of such data as shown in FIG. 15(a) has been effected in above described manner, a confirmation is made whether or not the input data is normal (Step 404), and if any abnormal data is present, such data is masked. In other words, whether the data is abnormal or not is confirmed by the user, and if any abnormality is found, the masking process is executed. For this purpose, the screen is first switched over from the indication screen status to the data screen status (for a display of an inputted and stored data) for the aforesaid data input (text screen status) to the data screen status. This changeover can be effected by manipulating the [2nd F] key 43 and the [T▶C▶D] key (∇ key) 44 a suitable number of times. Through such key maniuplation the screen is switched over to the data screen status as shown in FIG. 14. Thereupon, the input data in general-purpose RAM 15 as shown in FIG. 15(a) are read out according to the pointers stored in the data storage area with code "S" of the array memories 14 and are displayed on the graphic display portion 6 accordingly. In this display, character S represents the data storage area with code "S" in the series of array memories 14, (1, 1) and (2, 1) represent, respectively, first data for x and y, and numeric values shown at levels lower than the data represent values for x and y. The position of the cursor corresponds to the location at which character S flicks.

In the data screen state, the cursor causes character S to flick in order to indicate a first value for x, for example, of the input data. If the ∇ key 44 is manipulated, the cursor moves to a lower location to indicate a first value for y, and character S flicks at that location. If the Δ key 48 is maniuplated, the cursor moves upward. Therefore, by manipulating the ∇ key 44 or the Δ key 48 in the data screen state it is possible to select and specify a particular item of the input data. If an abnormal data is confirmed by reference to the input data in this way, the position of such data is selected and specified and the [2nd F] key 43 is maniuplated, then the [M] key 53, whereby the data at the position of flickering character S is masked (Step 405). The [M] key 53 is enabled to function as a [MASK] key by manipulating [2nd F] key 43. Thus, marking "M" is indicated after the mark "=" following the data displayed, so that the data is shown as being masked so that it can be visually distinguished from other data. Therefore, the masked data can easily be noticed.

Figure 19:
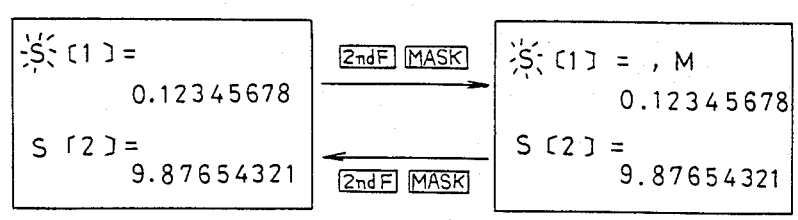
FIG. 19 is a view showing a representation on the display screen when a data is masked in the case of one variable being involved.

In the case of two variables x, y, if one of the variables is masked, the other is concurrently masked. Such a masked state is illustrated in detail in FIG. 17. In the case of one variable, a selected and specified data only is masked. In this state, as shown by way of example in FIG. 19, the specified portion only is masked.

Figure 18:
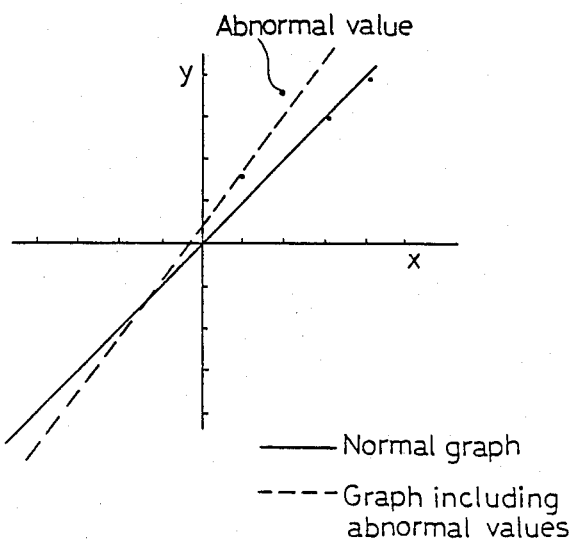
FIG. 18 is a view showing conditions of a graphic representation on a graphic display in the embodiment during data processing.

If reference to a graph or the like can help determine that a particular data input is abnormal, such graph may be displayed. For this purpose, it may be useful to have a linear function graph displayed according to the input data. For example, at Step 403, the [2nd F] key 43, the [G (LR)] key [DRAW] key) 34, the [AUTO] key 33 and the [DRAW] key 34 are manipulated sequentially in the text screen state, whereby a graph corresponding to the input data in FIG. 15(a) can be displayed as shown in FIG. 18 (Step 406). In this case, the dotted line is based on the input data in FIG. 15(a). In FIG. 18, the solid line represents a normal graph (not shown at the poont of time of Step 406). By referring to such graphic representation it may be judged that the input data representing data Nos. 6 and 7 in FIG. 15(a) are abnormal.

When abnormal data have been confirmed in a manner as above mentioned with respect to the input data and masked, key operations may be performed in order to carry out processing of the input data. Such operation may be done as required. In this conjunction, if it is desirable to have displayed a linear function graph of the data, the screen should be changed from the data screen state to the text screen state. This changeover can be done by manipulating the [2nd F] key 43, then the [T▶G▶D] key (∇ key) 44. Thus, the screen is changed over to the text screen state. When this condition is reached, as explained earlier, the [2nd F] key 43, the [G (LR)] key 38, the [AUTO] key 33 and the [DRAW] key 34 are sequentially manipulated, whereby a graph representation is given according to the solid line shown in FIG. 18 (Step 407). In this data processing, the masked data is omitted so that processing is carried out on the basis of the other parts of the input data. The data used for processing in this instance is shown in FIG. 15(b).

Next, the manner of control for a cancellation of the masked state will be explained.

First, the display screen is changed over to the data screen state. If the screen is in the text screen state or the graphic display screen state, it can be changed over to the data screen state by manipulating the [2nd F] key 43 and the [T▶G▶D] key 44 twice or once (Step 408). In the data screen state, the cursor is shifted to the "M" marked position for designation, and after this designation, the [2nd F] key 43 and the [MASK] key 53 are manipulated, whereupon the masked state is cancelled (Step 409) and the "M" indication goes out. It is easy to know whether the data is masked or not, because the masked state of the data is displayed on the screen.

In order to input additional data, the screen should be changed over to the text screen state at Step 410. In this case, as earlier mentioned, the [2nd F] key 43 is manipulated, then the 1 l[T▶G▶D] key (∇ key) 44 is manipulated, whereupon the screen is switched over to the data screen state. When this condition is reached, the same operation as in the case of data inputting is performed. Since the data which has been inputted under the data store mode is already stored, the total quantity of data corresponds to the total of the previously input data plus the additional input data. It is noted in this conjunction that the masked data disregarded in the data processing is included in the total quantity of input data. In other words, where the masked data is present, the quantity of data to be processed is not in agreement with the total quantity of data, as can be seen from FIGS. 15(a) and 15(b).

When storing further different data (Step 411), the [2nd F] key 43 and the [CL] key 54 (which corresponds to [CA] key) are manipulated, whereupon an indication "CLEAR→ENT" is given on the graphic display portion 6. Then the [ENT] key 55 is manipulated, and the procedure returns to Step 402 for inputting of the data title, whereby the data shown in FIGS. 15(a) and 15(b) are cleared.

The cancellation of the STAT mode is effected by sliding the mode changeover switch 8 (Step 412).

In the foregoing description, a graphic representation is given through a data input relating to linear functions, and if the input data includes any abnormal value, the abnormal data is masked. However, an application of masking is not limited to such a case alone. For example, in the case of calculating a mean value of input data, it is effective to mask any abnormal part of the data in order to average other parts of the data. In other words, if in the input data there is present any which is widely different in value from the rest of the input data, the mean value of the data is seriously influenced by the particular part of the data, with the result that a value quite different from the mean value of the rest of the data which are of average level is outputted. In order to avoid such an undesirable outcome, it is very advantageous to mask the abnormal part of the data and average the rest of the data.

What we claimed is:

1. An electronic calculator comprising: input means for inputting various data and commands;
  display means for displaying various data and information;
  memory means having a plurality of storage areas identified with location codes prior to input of calculation information;
  specifying means for specifying desired location codes when a series of dimension size data and data of each element for a matrix are to be stored in a desired coded storage area;
  storage means for storing the dimension size data and the data of each element for the matrix inputted from the input means into the storage area having the desired location code specified by the specifying means;
  matrix operation means for operating on the matrix stored in the storage means at the storage locations specified by said location codes stored in the memory means, by inputting from the input means a desired operational expression in which the location codes specified by the specifying means are used as operational elements;
  operation result memory means for storing operation results outputted from the matrix operation means;
  setting means for setting out a dimension size for the operation results in the operation result memory means prior to the operation results being stored therein; and
  display control means for controlling the display means to display the operation results stored in the operation results stored into he operation result memory means.

2. The electronic calculator according to claim 1, wherein the display means is a liquid crystal display comprising a plurality of crystal liquid cells arranged in a matrix pattern.

3. The electronic calculator according to claim 1, further comprising protection means for protecting the data stored in memory areas specified by the specifying means.

4. The electronic calculator according to claim 1, further comprising
  mask means for masking, on a command from the input means, any specific data of data stored in particular storage areas of the memory means and operation means for performing an operation on the basis of data other than the data masked by the mask means.

5. The electronic calculator according to claim 4, further comprising masked state display means for controlling the display means to display whether or not any data displayed on the display means on a command from the input means of those data which are stored in particular storage areas of the memory means are masked data, in conjunction with the data.

6. An electronic calculator comprising: input means for inputting various data and commands;
  display means for displaying various data and information;
  memory means having a plurality of storage areas identified with location codes prior to input of calculation information;
  specifying means for specifying desired location codes when a series of dimension size data and data of each element for a matrix are to be stored in a desired coded storage area;
  storage means for storing the dimension size data and the data of each element for the matrix inputted from the input means into the storage area having the desired location code specified by the specifying means;

matrix operation means for operating on the matrix stored in the storage means at the storage locations specified by said location codes stored in the memory means by inputting from the input means a desired operational expression in which the location codes specified by the specifying means are used as operational elements;

operation result memory means for storing operation results outputted from the matrix operation means;

setting means for setting out a dimension size for the operation results into the operation result memory means prior to the operation results being stored therein;

display control means for controlling the display means to display the operation results stored in the operation result memory means;

protection means for protecting the data stored in memory areas specified by the specifying means; and protected state display means for controlling the display means to display whether or not the data stored in memory areas specified by the specifying means are protected by the protection means, in conjunction with the data.

7. The electronic calculator according to claim 6, wherein the display means is a liquid crystal display comprising a plurality of crystal liquid cells arranged in a matrix pattern.

8. The electronic calculator according to claim 6, further comprising
    mask means for masking, on a command from the input means, any specific data of data stored in particular storage areas of the memory means and operation means for performing an operation on the basis of data other than the data masked by the mask means.

9. The electronic calculator according to claim 8, further comprising masked state display means for controlling the display means to display whether or not any data displayed on the display means on a command from the input means of those data which are stored in particular storage areas of the memory means are masked data, in conjunction with the data.

* * * * *